United States Patent [19]

Carré

[11] 4,045,798
[45] Aug. 30, 1977

[54] BAND-COMPRESSION DEVICE

[75] Inventor: Roland Carré, Paris, France

[73] Assignee: Thomson-CSF, Paris, France

[21] Appl. No.: 646,745

[22] Filed: Jan. 6, 1976

[30] Foreign Application Priority Data

Jan. 10, 1975 France .............................. 75.00718

[51] Int. Cl.² .................................................. G01S 7/28
[52] U.S. Cl. ............................ 343/17.2 PC; 325/477; 328/58
[58] Field of Search ............... 343/17.2 PC; 333/14; 328/58; 325/477

[56] References Cited

U.S. PATENT DOCUMENTS

| | | | |
|---|---|---|---|
| 2,989,743 | 6/1961 | Varela | 328/58 |
| 3,024,313 | 3/1962 | Ensink et al. | 333/14 |
| 3,068,417 | 12/1962 | Fiske | 328/58 |
| 3,247,457 | 4/1966 | Kaenel | 328/58 |
| 3,678,396 | 7/1972 | Hoffman | 325/477 |
| 3,965,428 | 6/1976 | Katz et al. | 325/477 |

Primary Examiner—S. C. Buczinski
Attorney, Agent, or Firm—Cushman, Darby & Cushman

[57] ABSTRACT

The present invention relates to a band compression device which make it possible to match a system furnishing signals of spectral width B, to a system having a pass-band $b$ smaller than B. It comprises successively and serially, a variable threshold gating device, an amplifier and a low-pass filter. Control means, connected to the output of the compression device, for controlling the threshold gating device, and permits a constant false alarm ratio in a radar application.

4 Claims, 8 Drawing Figures

BAND-COMPRESSION DEVICE

The present invention relates to band-compression devices and more particularly to devices of this kind which can be used in active detection systems such as radars and lidars.

It is well known, in other words, that in order to differentiate a target of small effective area, as for example a periscope or a snorkel belonging to a submarine, from its reflective environment of parasitic echos, it is necessary to improve the radar resolution. The resolution is increased in particular by reducing the length of the transmitted pulses. This method achieves the best ratio between the amplitude of the active signal and that of the parasitic echos stemming from the environment. Moreover, it increases the accuracy of ranging. On the other hand, however, the bandwidth of the video signals furnished by the receiver, is wider. In these applications, it is not a precision performance which is the objective. Again, the probability that two targets in the antenna beam will be very close, is virtually zero. The sole objective is to achieve adequate contrast between the echos from targets and environmental parasitic echos.

To retain the contrast performance, the processing systems which follow the receiver must have a pass-band at least equal to the spectral width of the video signal. This is generally out of the question if the processing system involves a conventional-cathode ray indicator or any other kind of device designed to display the results of detection to a human operator. The pass-band of this kind of device is restricted and it is necessary to interpose a band-compression device between receiver and processing system, in order to avoid the contrast losses which would result from mismatching.

One object of the invention, therefore, is to provide a band-compression device whose manufacturing cost is low. Since the effective signals are fundamentally pulses, compression is translated into terms of stretching of the pulse duration.

In accordance with the invention there is provided a band-compression device comprising an input terminal for receiving signals having a spectral width B, an output terminal for furnishing signals having a spectral width $b$, a variable-threshold gate of pass-band B, an amplifier circuit and a low-pass filter of pass-band $b$, connected in series between said input and output terminals.

Other features of the invention will become apparent in the course of the ensuing description illustrated by the figures where:

Figure 1:
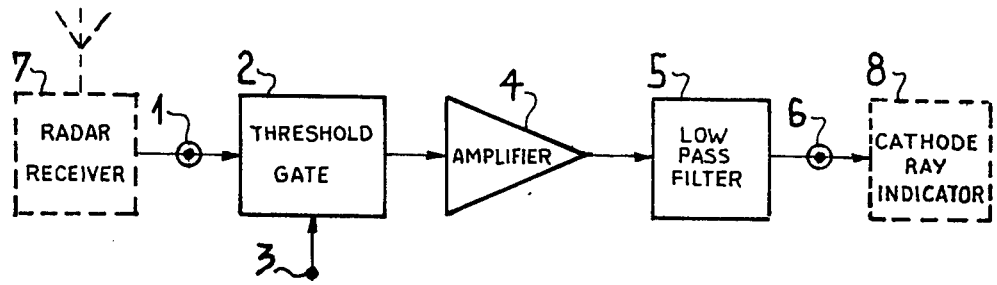
FIG. 1 is a band-compression device in accordance with the invention.

The device shown in FIG. 1 successively comprises an input terminal 1 and then, in series, a threshold gate circuit 2 comprising a threshold control input 3, an amplifier 4 functioning as an adder, a low-pass filter 5 and an output terminal 6. In broken line, up-circuit of the input terminal 1, a radar receiver has been shown, whilst down-circuit of the output terminal 6 there is a cathode ray indicator 8.

The threshold gate circuit 2 has a pass-band of the same width B as the spectral width of the signals furnished by the receiver 7. This circuit suppresses all signals whose amplitude is less than a reference threshold applied to the terminal 3. It preserves intact signals whose amplitude is greater than this threshold. The threshold gate 2 may be of diode or transistor type, with suitable polarisation. It may be combined with the amplifier 4.

The threshold is adjusted in such a fashion that the noise component filtered at the output 6 has a near-normal distribution, that is to say there is no major threshold gating effect. The filter 5 can be combined with the amplifier in order to form an active filter, an example of which will be described in relation to FIG. 3. However, it may be constituted by a simple resistive and capacitive network if a 6db per octave cut-off is sufficient, or by a more elaborate, second-order network of resistive, capacitive and inductive kind, if a 12db per octave cut-off is required. The bandwidth of the filter is equal to that $b$ of the processing device 8.

Figures 2A, 2B, 2C:
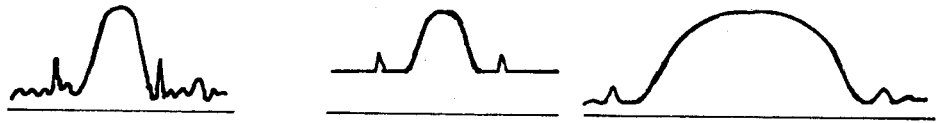
FIGS. 2a-2c illustrate the form of the signals at various points in the circuits.

FIG. 2 illustrates the form of the signals at various points in the circuit.

The signal ($a$) illustrates the signal furnished by the receiver during a brief instant precisely when an effective echo pulse is received. This pulse stands out from the parasitic echos whose amplitudes are substantially lower than that of the effective echo.

Figure 3:
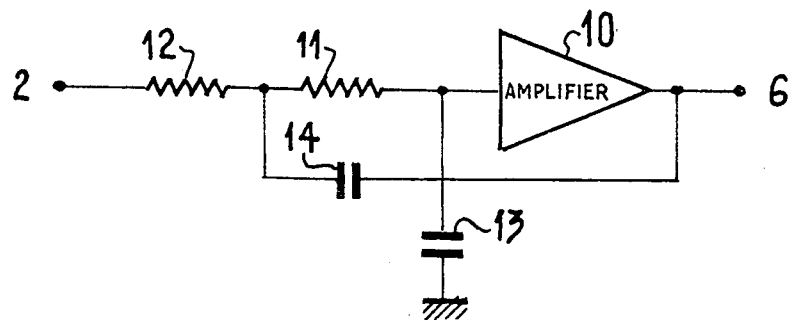
FIG. 3 is an example of a low-pass amplifier filter.

The output signal from the threshold gate is shown in ($b$). The amplitude of the effective signal is attenuated but the parasitic echos are virtually suppressed. The signal is amplified and filtered and, at the output 6, becomes the signal ($c$) expanded by the low-pass filter so that it has a narrower spectral width than the input signal. FIG. 3 illustrates an embodiment of an active low-pass filter. It comprises an amplifier 10 to the input of which there are connected in series two resistors 11 and 12 designed to receive the output signal from the threshold gate 2, and a capacitor 13 whose other terminal is taken to the circuit earth. A second capacitor 14 is connected between the junction between resistors 11 and 12, and the amplifier output.

The values of the various elements are designed in such a fashion that the cut-off frequency of the filter is equal to $b$. Self-evidently, other kinds of active low-pass filters familiar to those skilled in the art, would be suitable for the creation of a band-pass compression device in accordance with the invention.

The device described is characterised by a low manufacturing cost but the signal-to-noise ratio after compression decreases substantially if the desired compression ratio is greater than 5.

It is possible, however, to achieve compression ratios greater than 5 with an acceptable signal-to-noise ratio, by combining the device in accordance with that which forms the object of French Patent Application No. 73.01748. The latter essentially comprises a tapped delay line and an OR-gate connected to all the tappings. The delay between two tappings is substantially equal to the duration of the pulses which are to be stretched, and the compression ratio is equal to the number of tappings in the delay line (including input and output). At the output of the OR-gate, a low-pass filter effects matching between the compression device and the processing system.

The delay-line compression device involves a higher manufacturing cost than does the threshold gating device, but its signal-to-noise ratio performance is better.

Figure 4:
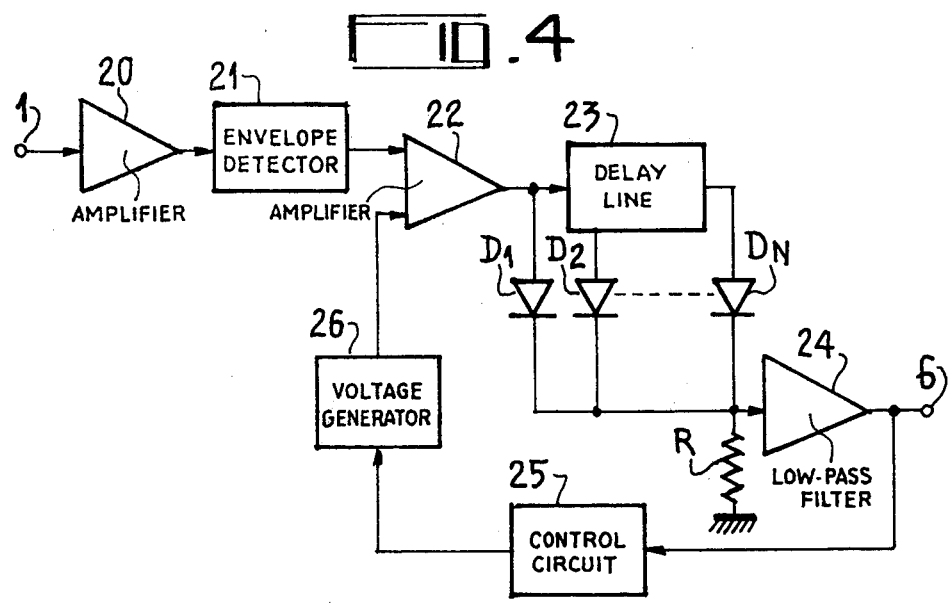
FIG. 4 shows an improvement in the compression device.

FIG. 4 illustrates a combination of the two devices.

The input signals, applied to the input terminal 1, are transmitted to an amplifier 20 of pass-band B (an intermediate frequency signal amplifier for example). The output signals from the amplifier 20 are applied to an envelope detector 21 and then to a video amplifier 22 whose output supplies the tapped delay line 23 (the number of tappings is equal to N, including input and output). The pass-band of the elements 20 to 23 is equal to B. The tappings of the delay line are connected to an OR-gate with diodes D1, D2, ... DN. These diodes are connected to a resistor R and an amplifier functioning as a low pass filter 24 whose output furnishes the compressed signals at the terminal 6.

Threshold gating is performed by the diodes of the OR-gate, by the application of a voltage to the diode through the medium of a delay line 23 and the amplifier 22, from a threshold gating voltage generator 26. The amplifier 22 which receives the video signals and the threshold gating voltage, has two inputs. The diodes are biased by a voltage whose polarity is the reverse of that of the signals appearing at the tappings of the delay line. The amplifier-filter 24 which has a pass-band $b$, amplifies the signals picked off by the resistor R.

The threshold gating device of FIG. 1 is therefore constituted by diodes D1 to DN which are biased across the delay line. The low-pass output filter is common to the two compression devices. Threshold gating is performed by the addition of a voltage at the amplifier 22. The latter may be a differential input amplifier.

The device of FIG. 4 furthermore comprises circuits (25 and 26) which make it possible to achieve a constant false alarm ratio. Since the parasitic signals vary substantially (if we are dealing with a radar, they depend upon the aerial bearing and the range from the radar station), it is advantageous to effect automatic control of the threshold gating voltage applied to the amplifier 22. The threshold gating voltage produced by the generator 26 is controlled by a control circuit 25 supplied with the output signals from the compression device.

Figure 5:
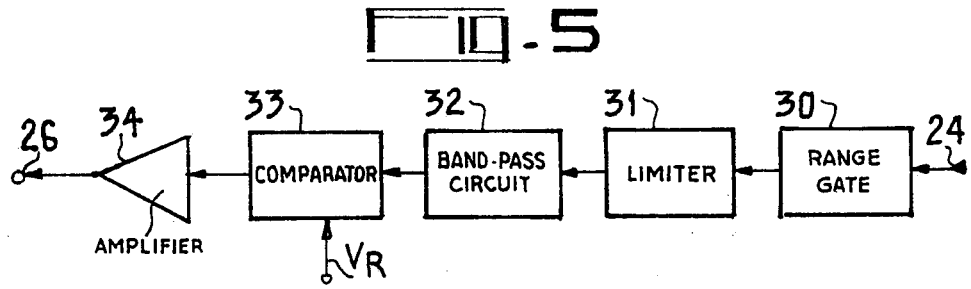
FIG. 5 is an example of a control circuit.

Detail of the control circuit 25 is given in FIG. 5.

The output of the amplifier 24 is applied to the input of a range gate 30 associated with an amplifier-limiter stage 31. The output signals from the limiter are filtered and integrated in a band-pass circuit 32 constituted by a resistive/capacitive network for example. The output of the filter 32 and a reference voltage VR fixing the acceptable false alarm level, are compared in a comparator 33. The error signal is applied to an amplifier 34, whose output is connected to a control input of the generator 26.

The position of the range gate in the radar recurrence, and its duration, are determined in accordance with the distribution of the level of the parasitic signals as a function of range. This range gate is designed to eliminate high-amplitude signals from the initial part of the recurrence, these corresponding to near obstacles, and those from the end of the recurrence whose amplitude, by contrast, is too low.

Figure 6:
FIG. 6 is illustrates the form of the signals in the control circuit.

FIG. 6 shows the form of the signals at the output of the amplifier-limiter, 31. In the equilibrium state, the reference voltage VR is identical to the product of the clipping voltage VL and the filling factor of the signals, that is to say to the mean value of the signals at the out of the filter 32.

What is claimed is:

1. A band-compression device comprising an input terminal for receiving signals having a spectral width B, an output terminal for furnishing signals having a spectral width $b$, which is less than B, a variable-threshold gate of pass-band B, an amplifier circuit, a low-pass filter of pass-band $b$, and means for connecting said gate, circuit and filter in series between said input and output terminals with said gate connected to said input terminal and said filter connected to said output terminal, wherein said threshold gate comprises in series an envelope detector circuit, an amplifier-adder supplied with the output signal from a detector on one input and a reference voltage on another input, a tapped delay line connected to the output of the amplifier-adder, and an OR gate with diodes connected to the delay line tappings, the output of the OR-gate being connected to said amplifier circuit.

2. A band-compression device as claimed in claim 1, wherein said amplifier circuit and said low-pass filter are constituted by an operational amplifier, two resistors connected in series with the input of said amplifier, a first capacitor connected between the amplifier and the circuit earth, and a second capacitor connected between the common point between the two resistors, and the output of the amplifier.

3. A band-compression device as claimed in claim 1, wherein said reference voltage is produced by a voltage generator controlled by a control circuit utilising the output signal from said compression device for obtaining a constant false alarm ratio.

4. A band-compression device as claimed in claim 3, wherein said control circuit successively and serially comprises a range gate, an amplifier-limiter, a band-pass filter, a comparator circuit using a reference voltage and an amplifier.

* * * * *